United States Patent
Liao et al.

(10) Patent No.: US 12,492,286 B2
(45) Date of Patent: Dec. 9, 2025

(54) PLASTICIZER AND METHOD FOR MANUFACTURING THE SAME

(71) Applicant: NAN YA PLASTICS CORPORATION, Taipei (TW)

(72) Inventors: Te-Chao Liao, Taipei (TW); Jung-Jen Chuang, Taipei (TW); Chung-Yu Chen, Taipei (TW); Jung-Tsu Wu, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 535 days.

(21) Appl. No.: 18/072,619

(22) Filed: Nov. 30, 2022

(65) Prior Publication Data
US 2023/0374202 A1    Nov. 23, 2023

(30) Foreign Application Priority Data
May 23, 2022 (TW) ................ 111119030

(51) Int. Cl.
| | |
|---|---|
| *C08G 63/672* | (2006.01) |
| *C08G 63/16* | (2006.01) |
| *C08G 63/20* | (2006.01) |
| *C08G 63/50* | (2006.01) |
| *C08G 63/78* | (2006.01) |

(52) U.S. Cl.
CPC ............. *C08G 63/16* (2013.01); *C08G 63/20* (2013.01); *C08G 63/50* (2013.01); *C08G 63/672* (2013.01); *C08G 63/78* (2013.01)

(58) Field of Classification Search
None
See application file for complete search history.

(56) References Cited

U.S. PATENT DOCUMENTS

| | | | |
|---|---|---|---|
| 2003/0114564 A1* | 6/2003 | Lang .................. | C08L 27/06 524/315 |
| 2015/0135990 A1 | 5/2015 | Harada et al. | |
| 2019/0048157 A1 | 2/2019 | Shih et al. | |
| 2022/0056203 A1 | 2/2022 | Liao et al. | |

FOREIGN PATENT DOCUMENTS

| | | |
|---|---|---|
| CN | 104822742 A | 8/2015 |
| CN | 104926648 A | 9/2015 |
| CN | 108752803 A | 11/2018 |
| CN | 111533889 A | 8/2020 |
| CN | 113004506 A | 6/2021 |
| JP | 2004161801 A | 6/2004 |
| JP | 201225851 A | 2/2012 |
| JP | 2013234273 A | 11/2013 |
| TW | 202208316 A | 3/2022 |
| WO | WO2022004320 A1 | 1/2022 |

OTHER PUBLICATIONS

Adhesives Technology Handbook (2008) pp. 21-36. (Year: 2008).*

* cited by examiner

Primary Examiner — David J Buttner
(74) Attorney, Agent, or Firm — Li & Cai Intellectual Property Office

(57) ABSTRACT

A plasticizer and a method for manufacturing the plasticizer are provided. The method includes the following steps. A dicarboxylic acid, a diol, and a catalyst are mixed to form a reactant mixture. The reactant mixture is reacted at a temperature ranging from 130° C. to 220° C. to form a semi-product. An endcapping alcohol is added into the semi-product at a temperature ranging from 205° C. to 220° C. to form a coarse plasticizer. The coarse plasticizer is purified under a pressure ranging from 760 Torr to 5 Torr to obtain the plasticizer. The dicarboxylic acid includes succinic acid or adipic acid. The diol includes diethylene glycol and 2-methyl-1,3-propanediol. The endcapping alcohol is an ether alcohol or a fatty alcohol having a carbon number of less than or equal to 4. The dicarboxylic acid, the diol, and the endcapping alcohol have a molar ratio ranging from 1:0.6 to 0.9:0.3 to 0.6.

17 Claims, 1 Drawing Sheet

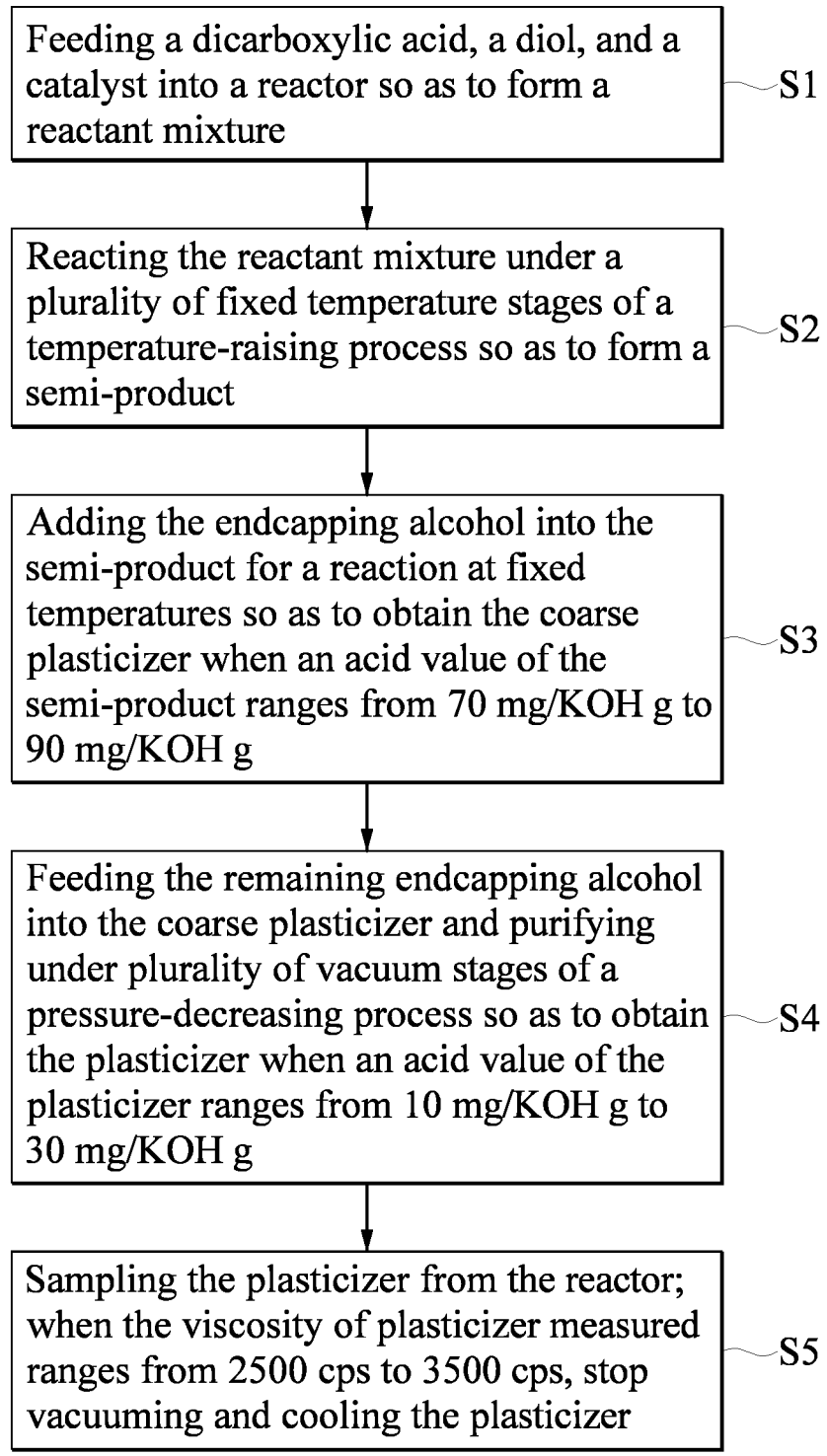

PLASTICIZER AND METHOD FOR MANUFACTURING THE SAME

CROSS-REFERENCE TO RELATED PATENT APPLICATION

This application claims the benefit of priority to Taiwan Patent Application No. 111119030, filed on May 23, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a plasticizer and a method for manufacturing the same, and more particularly to a plasticizer that has high surface tension and a method for manufacturing the same.

BACKGROUND OF THE DISCLOSURE

Plasticizer is widely used in a production process of a plastic material, a coating material, a pigment material, an adhesive, or plaster. An addition of the plasticizer can liquefy or soften a material, such that the material can be molded easily. In the related art, phthalates (PAEs) are the most widely used plasticizer. However, over long-term usage, the safety of phthalates (PAEs) is constantly being questioned.

In 2008, phthalates (PAEs) were listed in a candidate list of substances of very high concern (SVHC) by European Chemicals Agency (ECHA). An amount of phthalates (PAEs) that can be added into products is restricted to being below 0.1 wt %. The phthalates (PAEs) that are under surveillance and control include di-n-butyl phthalate (DBP), bis(2-ethylhexyl)phthalate (DEHP), and benzyl butyl phthalate (BBP). Accordingly, numerous efforts have been dedicated to developing various environmentally friendly plasticizers in the relevant field, so as to replace the conventional phthalates plasticizer.

Also, water-based processes are gradually being adopted by downstream manufacturers as a preference for the sake of environmental protection. In the water-based processes, additives, in addition to plasticizer, should have adequate hydrophilicity to mix with other components. If the plasticizer has low hydrophilicity, the plasticizer may separate from the product (migration). Accordingly, the quality of the product may be negatively affected and have poor glue filling property and poor printability.

Unfortunately, environmentally friendly plasticizers that can currently be found on the market are still lacking in certain properties for being applied in the water-based processes, specifically for those with a surface tension of ranging from approximately 33 dynes to 35 dynes (measured at 25° C.).

SUMMARY OF THE DISCLOSURE

In response to the above-referenced technical inadequacies, the present disclosure provides a plasticizer and a method for manufacturing the same.

In one aspect, the present disclosure provides a method for manufacturing a plasticizer. The method for manufacturing the plasticizer includes: mixing a dicarboxylic acid, a diol, and a catalyst to form a reactant mixture; reacting the reactant mixture at a temperature ranging from 130° C. to 220° C. so as to form a semi-product; adding an endcapping alcohol into the semi-product at a temperature ranging from 205° C. to 220° C. so as to form a coarse plasticizer, and purifying the coarse plasticizer under a pressure ranging from 760 Torr to 5 Torr so as to obtain the plasticizer. The dicarboxylic acid, the diol, and the endcapping alcohol have a molar ratio ranging from 1:0.6 to 0.9:0.3 to 0.6. The dicarboxylic acid includes succinic acid or adipic acid. The diol includes diethylene glycol and 2-methyl-1, 3-propanediol. The endcapping alcohol is an ether alcohol or a fatty alcohol having a carbon number of less than or equal to 4.

In certain embodiments, the ether alcohol is selected from the group consisting of: diethylene glycol monomethyl ether, diethylene glycol monoethyl ether, diethylene glycol monobutyl ether, dipropylene glycol monomethyl ether, dipropylene glycol monoethyl ether, dipropylene glycol monobutyl ether, tripropylene glycol monomethyl ether, ethylene glycol monomethyl ether, ethylene glycol monoethyl ether, ethylene glycol monobutyl ether, propylene glycol monomethyl ether, propylene glycol monoethyl ether, and propylene glycol monobutyl ether. The fatty alcohol is selected from the group consisting of: methanol, ethanol, isopropanol, and n-butanol.

In certain embodiments, the dicarboxylic acid includes succinic acid and adipic acid. A molar amount of succinic acid is less than or equal to a molar amount of adipic acid, and a molar ratio of succinic acid to the dicarboxylic acid is higher than or equal to 0.2.

In certain embodiments, a molar ratio of succinic acid to adipic acid ranges from 1:1 to 1:4.

In certain embodiments, a molar amount of diethylene glycol is less than or equal to a molar amount of 2-methyl-1, 3-propanediol, and a molar ratio of diethylene glycol to the diol is higher than or equal to 0.25.

In certain embodiments, a molar ratio of diethylene glycol to 2-methyl-1, 3-propanediol ranges from 1:1 to 1:3.

In certain embodiments, the reactant mixture is reacted under a plurality of fixed temperature stages of a temperature-raising process. A temperature range of the temperature-raising process ranges from 130° C. to 220° C. The coarse plasticizer is purified under a plurality of vacuum stages of a pressure-decreasing process so as to obtain the plasticizer. A pressure range of the pressure-decreasing process ranges from 760 Torr to 5 Torr.

In certain embodiments, the plurality of fixed temperature stages includes a first fixed temperature stage, a second fixed temperature stage, a third fixed temperature stage, a fourth fixed temperature stage, and a fifth fixed temperature stage, a temperature range of the first fixed temperature stage ranges from 130° C. to 150° C., a temperature range of the second fixed temperature stage ranges from 150° C. to 170° C., a temperature range of the third fixed temperature stage ranges from 170° C. to 190° C., a temperature range of the fourth fixed temperature stage ranges from 190° C. to 205° C., and a temperature range of the fifth fixed temperature stage ranges from 205° C. to 220° C.

In certain embodiments, when an acid value of the semi-product ranges from 70 mg KOH/g to 90 mg KOH/g, the temperature-raising process is completed.

In certain embodiments, when an acid value of the coarse plasticizer ranges from 10 mg KOH/g to 30 mg KOH/g, the pressure-decreasing process is started.

In certain embodiments, the pressure-decreasing process includes a first vacuum stage, a second vacuum stage, a third vacuum stage, a fourth vacuum stage, and a fifth vacuum stage, a pressure range of the first vacuum stage ranges from 750 Torr to 400 Torr, a pressure range of the second vacuum stage ranges from 400 Torr to 300 Torr, a pressure range of the third vacuum stage ranges from 300 Torr to 150 Torr, a pressure range of the fourth vacuum stage ranges from 150 Torr to 20 Torr, and a pressure range of the fifth vacuum stage ranges from 20 Torr to 10 Torr.

In certain embodiments, the method further including: feeding the dicarboxylic acid, the diol, and the catalyst into a reactor, and adding the endcapping alcohol during the temperature-raising process so as to form the reactant mixture.

In another aspect, the present disclosure provides a plasticizer. The plasticizer is polymerized from a dicarboxylic acid, a diol, and an endcapping alcohol. The dicarboxylic acid, the diol, and the endcapping alcohol have a molar ratio ranging from 1:0.6 to 0.9:0.3 to 0.6. The dicarboxylic acid includes succinic acid or adipic acid. The diol includes diethylene glycol and 2-methyl-1, 3-propanediol. The endcapping alcohol is an ether alcohol or a fatty acid having a carbon number of less than or equal to 4. The surface tension of the plasticizer ranges from 37 dynes to 40 dynes.

In certain embodiments, the plasticizer has a color having an Alpha value of less than 100.

In certain embodiments, a viscosity of the plasticizer ranges from 1500 cps to 3000 cps.

In certain embodiments, a weight-average molecular weight of the plasticizer ranges from 2500 g/mol to 3500 g/mol.

In certain embodiments, the ether alcohol is selected from the group consisting of: diethylene glycol monomethyl ether, diethylene glycol monoethyl ether, diethylene glycol monobutyl ether, dipropylene glycol monomethyl ether, dipropylene glycol monoethyl ether, dipropylene glycol monobutyl ether, tripropylene glycol monomethyl ether, ethylene glycol monomethyl ether, ethylene glycol monoethyl ether, ethylene glycol monobutyl ether, propylene glycol monomethyl ether, propylene glycol monoethyl ether, and propylene glycol monobutyl ether. The fatty alcohol is selected from the group consisting of: methanol, ethanol, isopropanol, and n-butanol.

In certain embodiments, the dicarboxylic acid includes succinic acid and adipic acid. A molar ratio of succinic acid to adipic acid ranges from 1:1 to 1:4.

In certain embodiments, a molar ratio of diethylene glycol to 2-methyl-1, 3-propanediol ranges from 1:1 to 1:3.

Therefore, in the plasticizer and the method for manufacturing the same provided by the present disclosure, by virtue of "the dicarboxylic acid including succinic acid or adipic acid," "the glycol including diethylene glycol and 2-methyl-1, 3-propanediol," and "the endcapping alcohol being an ether alcohol or a fatty alcohol having a carbon number of less than or equal to 4," the surface tension of the plasticizer can be enhanced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart of a method for manufacturing a plasticizer of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a plasticizer and a method for manufacturing the plasticizer. The plasticizer of the present disclosure does not belong to phthalates, so as to eliminate relevant safety concerns regarding the usage of the plasticizer. The plasticizer of the present disclosure is an environmentally friendly plasticizer that has a high surface tension, such that the plasticizer of the present disclosure can be applied in water-based processes. Specifically, when measured at 25° C., the surface tension of the plasticizer of the present disclosure can be higher than 38 dynes (even higher than 39 dynes), which is higher than the surface tension (33 dynes to 35 dynes) of the environmentally friendly plasticizer on the market.

The plasticizer of the present disclosure is polymerized from specific dicarboxylic acid, diol, and endcapping alcohol. By choosing the specific components to polymerize the plasticizer, the plasticizer can have a high hydrophilicity. In the present disclosure, hydrophilicity of the plasticizer can be quantified in terms of the surface tension of the plasticizer.

Referring to FIG. 1, the method for manufacturing the plasticizer of the present disclosure includes steps as follows. In step S1, feeding a dicarboxylic acid, a diol, and a catalyst into a reactor so as to form a reactant mixture. A temperature of the reactor is set at 150° C., and a pressure condition in the reactor is normal pressure.

The dicarboxylic acid includes succinic acid or adipic acid. In some embodiments, the dicarboxylic acid of the present disclosure is a mixed acid containing succinic acid and adipic acid. A molar ratio of succinic acid to adipic acid ranges from 1:1 to 1:4. Preferably, the molar ratio of succinic acid to adipic acid ranges from 1:2 to 1:3.5. For example, the molar ratio of succinic acid to adipic acid can be 1:2.1, 1:2.3, 1:2.5, 1:2.7, 1:2.9, 1:3.1, or 1:3.3. When both succinic acid and adipic acid are used as the dicarboxylic acid, the surface tension of the plasticizer can be enhanced by adjusting a structure of the plasticizer. Moreover, the enhancement of the surface tension of the plasticizer cannot be achieved by adding only succinic acid or adipic acid. In an exemplary embodiment, a molar amount of succinic acid is less than or equal to a molar amount of adipic acid. A molar ratio of succinic acid to the dicarboxylic acid is larger than or equal to 0.2. By controlling the molar amounts of succinic acid and adipic acid, the surface tension of the plasticizer can be enhanced due to the structure of the plasticizer.

The diol includes diethylene glycol and 2-methyl-1, 3-propanediol. In other words, the diol is a mixed alcohol containing diethylene glycol and 2-methyl-1, 3-propanediol. A molar ratio of the diethylene glycol to 2-methyl-1, 3-propanediol ranges from 1:1 to 1:3. Preferably, the molar ratio of the diethylene glycol to 2-methyl-1, 3-propanediol ranges from 1:1.3 to 1:2.8. For example, the molar ratio of diethylene glycol to 2-methyl-1, 3-propanediol can be 1:1.5, 1:1.7, 1:1.9, 1:2.1, 1:2.3, 1:2.5, or 1:2.7. When both diethylene glycol to 2-methyl-1, 3-propanediol are used as the diol, the surface tension of the plasticizer can be enhanced due to the structure of the plasticizer. Moreover, the enhancement of the surface tension of the plasticizer cannot be achieved by adding only diethylene glycol or 2-methyl-1, 3-propanediol.

In an exemplary embodiment, a molar amount of diethylene glycol is less than or equal to a molar amount of 2-methyl-1, 3-propanediol. A molar ratio of diethylene glycol to 2-methyl-1, 3-propanediol is higher than or equal to 0.25. The surface tension of the plasticizer can be enhanced by adjusting the amounts of diethylene glycol and 2-methyl-1, 3-propanediol so that the structure of the plasticizer can be controlled.

The catalyst can be titanium catalyst, tin catalyst, sodium catalyst, zinc catalyst, or magnesium catalyst. Specifically, the catalyst is selected from the group consisting of: titanate, stannous oxide, stannous oxalate, sodium aluminate, titanium oxide, zinc oxide, and magnesium oxide. Preferably, the catalyst is a titanate.

In an exemplary embodiment, the dicarboxylic acid, the diol, and the catalyst can be fed into the reactor so as to form the reactant mixture.

In step S2, the reactant mixture is reacted at a plurality of fixed temperature stages of a temperature-raising process so as to form a semi-product. In the temperature-raising process, water generated from an esterification reaction can be evaporated to be removed from the reactant mixture at a high temperature (higher than 100° C.).

A temperature of the temperature-raising process can be within a range from 130° C. to 220° C. In an exemplary embodiment, a temperature range of the temperature-raising process ranges from 140° C. to 210° C. A plurality of temperature values chosen from the temperature range are respectively set as predetermined temperature values of the fixed temperature stages. In some embodiments, the predetermined temperature values can include the upper limit value or the lower limit value of the temperature range. A number of the predetermined temperature values can be larger than or equal to 3. Preferably, the number of the predetermined temperature values can be larger than or equal to 4.

For example, when the temperature range ranges from 130° C. to 220° C., the predetermined temperature values can be any value within a range from 130° C. to 220° C., such as, but not limited to, 140° C., 150° C., 160° C., 170° C., 180° C., 190° C., 200° C., or 210° C., and selectively including the upper limit value and the lower limit value of the range of from 130° C. to 220° C.

In order to control a reaction rate of the reactant mixture, the temperatures set in the plurality of fixed temperature stages of the present disclosure are controlled. In an exemplary embodiment, the plurality of fixed temperature stages are sequentially operated in an order from low temperature to high temperature, respectively being a first fixed temperature stage, a second fixed temperature stage, a third fixed temperature stage, a fourth fixed temperature stage, and a fifth fixed temperature stage. A temperature range of the first fixed temperature stage ranges from 130° C. to 150° C. A temperature range of the second fixed temperature stage ranges from 150° C. to 170° C. A temperature range of the third fixed temperature stage ranges from 170° C. to 190° C. A temperature range of the fourth fixed temperature stage ranges from 190° C. to 205° C. A temperature range of the fifth fixed temperature stage ranges from 205° C. to 220° C. Duration of each of the first fixed temperature stage, the second fixed temperature stage, the third fixed temperature stage, the fourth fixed temperature stage, and the fifth fixed temperature stage ranges from 0.5 hours to 4 hours.

In the temperature-raising process, the duration of each of the fixed temperature stages can be adjusted according to the number of the predetermined temperature values or differences between the predetermined temperature values. Specifically, when the number of the predetermined temperature values is large, the duration of each of the fixed temperature stages can be shortened. Conversely, when the number of the predetermined temperature values is small, the duration of each of the fixed temperature stages can be prolonged. When the differences between the temperature values are large, the duration of each of the fixed temperature stages can be prolonged. Conversely, when the differences between the temperature values are small, the duration of each of the fixed temperature stages can be shortened.

As for the entire temperature-raising process, an average heating rate of the reaction mixture ranges from 5° C./hour to 8° C./hour.

In the temperature-raising process, the reactants can be completely reacted with each other, so as to avoid a generation of low molecular weight polymers from incomplete polymerization. A viscosity uniformity of the product and quality of the plasticizer are negatively influenced by the generation of the low molecular weight polymers. In addition, the low molecular weight polymers may migrate from the plasticizer during processing, which causes poor processability.

If the reactant mixture is heated with a continuously rising temperature (the temperature of the reactor changing with time), the endcapping alcohol may prematurely react with the dicarboxylic acid at the beginning. As a result, the terminal acid group of the dicarboxylic acid will be replaced, and the polymerization reaction cannot continue, thereby generating the low molecular weight polymer. Therefore, the plurality of fixed temperature stages of the temperature-raising process of the present disclosure can prevent the generation of low molecular weight polymers.

In step S3, when an acid value of the semi-product ranges from 70 mg/KOH g to 90 mg/KOH g, the temperature-raising process (in step S2) is completed. A part of the endcapping alcohol is added into the semi-product, and then the endcapping alcohol and the semi-product are reacted at fixed temperatures (205° C. to 220° C.) so as to obtain the coarse plasticizer. By adjusting a timing that the endcapping alcohol is added, the molecular weight of the plasticizer and the viscosity of the plasticizer can be controlled.

The endcapping alcohol can be the fatty acid having a carbon number of less than or equal to 4 or the ether alcohol. The fatty acid can be methanol, ethanol, isopropanol, and butanol. It should be noted that when the endcapping alcohol is the fatty acid having a carbon number of less than or equal to 4 (such as butanol), the surface tension of the plasticizer can be enhanced.

The ether alcohol can be selected from the group consisting of: diethylene glycol monomethyl ether, diethylene glycol monoethyl ether, diethylene glycol monobutyl ether, dipropylene glycol monomethyl ether, dipropylene glycol monoethyl ether, dipropylene glycol monobutyl ether, tripropylene glycol monomethyl ether, ethylene glycol monomethyl ether, ethylene glycol monoethyl ether, ethylene glycol monobutyl ether, propylene glycol monomethyl ether, propylene glycol monoethyl ether, and propylene glycol monobutyl ether.

In an exemplary embodiment, the dicarboxylic acid, the diol, and the endcapping alcohol have a molar ratio ranging from 1:0.6 to 0.9:0.3 to 0.6 (i.e., a molar ratio of the dicarboxylic acid:the diol:the endcapping alcohol ranging from 1:0.6 to 0.9:0.3 to 0.6). Preferably, the dicarboxylic acid, the diol, and the endcapping alcohol have the molar ratio ranging from 1:0.75 to 0.9:0.3 to 0.45. More preferably, the dicarboxylic acid, the diol, and the endcapping alcohol have the molar ratio ranging from 1:0.85 to 0.89:0.32 to 0.43.

It should be noted that the plasticizer that has high surface tension can be polymerized by choosing the abovementioned dicarboxylic acid, the diol, and the endcapping alcohol. Specifically, by using the abovementioned encapping alcohol that has high hydrophilicity to polymerize the plasticizer, the surface tension of the plasticizer can be dramatically enhanced.

In step S4, when an acid value of the plasticizer ranges from 10 mg/KOH g to 30 mg/KOH g, the remaining endcapping alcohol is fed, and a pressure-decreasing process is started.

In the pressure-decreasing process, low-boiling substances (usually the low molecular weight polymer) can be removed so as to maintain a viscous uniformity of the plasticizer. Accordingly, the plasticizer of the present disclosure can have advantages of good processability, low odor, and good coloration.

A pressure of the pressure-decreasing process can be within a range from 760 Torr to 5 Torr. In an exemplary embodiment, a pressure range of the pressure-decreasing process ranges from 750 Torr to 10 Torr. A plurality of pressure values chosen from the pressure range are respectively set as predetermined pressure values of the vacuum stages. In some embodiments, the predetermined pressure values can include the upper limit value or the lower limit value of the pressure range. A number of the predetermined pressure values can be higher than or equal to 3. Preferably, the number of the predetermined pressure values can be higher than or equal to 4.

For example, when the pressure range ranges from 760 Torr to 5 Torr, the predetermined pressure values can be any value within a range from 760 Torr to 5 Torr, such as 750 Torr, 700 Torr, 600 Torr, 500 Torr, 400 Torr, 300 Torr, 200 Torr, 100 Torr, 50 Torr, or 10 Torr, including the upper limit value and the lower limit value of the range of from 760 Torr to 5 Torr, but is not limited thereto.

In order to control the purity of the semi-product, the pressure set in the plurality of each vacuum stages are controlled. In an exemplary embodiment, the plurality of vacuum stages are sequentially operated in an order from high pressure to low pressure, respectively being a first vacuum stage, a second vacuum stage, a third vacuum stage, a fourth vacuum stage, and a fifth vacuum stage. A pressure range of the first vacuum stage ranges from 760 Torr to 450 Torr. A pressure range of the second vacuum stage ranges from 450 Torr to 300 Torr. A pressure range of the third vacuum stage ranges from 300 Torr to 200 Torr. A pressure range of the fourth vacuum stage ranges from 200 Torr to 100 Torr. A pressure range of the fifth vacuum stage ranges from 100 Torr to 5 Torr. Duration of each of the first vacuum stage, the second vacuum stage, the third vacuum stage, the fourth vacuum stage, and the fifth vacuum stage ranges from 0.5 hours to 3 hours.

In the pressure-decreasing process, the duration of each vacuum stage can be adjusted according to the number of the predetermined pressure values or differences between the predetermined pressure values. Specifically, when the number of the predetermined pressure values is large, the duration of each vacuum stage can be shortened. Conversely, when the number of the predetermined pressure values is small, the duration of each pressure stage can be prolonged. When the differences between the pressure values are large, the duration of each vacuum stage can be prolonged. Conversely, when the differences between the pressure values are small, the duration of each vacuum stage can be shortened.

As for the entire pressure-decreasing process, an average pressure-reducing rate of the semi-product ranges from 75 Torr/hour to 125 Torr/hour.

In step S5, the plasticizer is sampled from the reactor, and then the acid value of the plasticizer is measured. When the acid value of the plasticizer is lower than 1 mg KOH/g, the reactor is vacuumed to reach a pressure lower than 10 Torr, but is not limited thereto. Subsequently, the plasticizer is sampled to measure the viscosity. When the viscosity of plasticizer measured at 25° C. ranges from 2500 cps to 3500 cps, the reaction is completed and the vacuuming is stopped. After cooling to 40° C., the plasticizer of the present disclosure is unloaded and then obtained. In a preferable embodiment, when the viscosity of the plasticizer measured at 25° C. ranges from 2800 cps to 3200 cps, the pressure-decreasing process is completed.

According to the above contents, the molecular weight and the viscosity of the plasticizer can be controlled by the method for manufacturing the plasticizer of the present disclosure. Therefore, the plasticizer can have excellent processability, such that the plasticizer can be applied in a water-based plastic material, a water-based resin coating, or other water-based processes. In addition, the method for manufacturing the plasticizer of the present disclosure can reduce the generation of the low molecular weight polymers, thereby preventing the final product from having inferior quality caused by migration of the low molecular weight polymers.

[Experiment Test]

To prove that using the specific dicarboxylic acid can enhance the surface tension of the plasticizer, the plasticizers of Examples 1 to 5 that have high surface tension are manufactured according to the abovementioned steps S1 to S5. The difference between Examples 1 to 5 is using different dicarboxylic acids and different endcapping alcohols. Specifically, the dicarboxylic acid in Examples 1 to 3 includes succinic acid and adipic acid. The dicarboxylic acid in Example 4 includes only succinic acid. The dicarboxylic acid in Example 5 includes only adipic acid. The endcapping alcohol in Examples 1 and 3 to 5 is the ether alcohol (diethylene glycol monomethyl ether). The endcapping alcohol in Example 2 is the fatty acid (butanol). Specific steps are illustrated as follows.

Example 1

215 g (1.47 mole) of adipic acid, 55 g (0.47 mole) of succinic acid, 100 g (1.11 mole) of 2-methyl-1, 3-propanediol, 60 g (0.57 mole) of diethylene glycol, and 0.5 g of titanium catalyst are fed in a reactor, and then mixed under a condition of 140° C. and 760 Torr to form a reactant mixture.

According to Table 1, the reactant mixture undergoes the plurality of fixed temperature stages of the temperature-raising process (step S2) to form a semi-product. During the temperature-raising process, water and alcohol are removed.

TABLE 1

| Temperature-raising process | Predetermined temperature value | Duration |
| --- | --- | --- |
| First fixed temperature stage | 140° C. | 2 hours |
| Second fixed temperature stage | 160° C. | 2 hours |
| Third fixed temperature stage | 180° C. | 2 hours |
| Fourth fixed temperature stage | 200° C. | 2 hours |
| Fifth fixed temperature stage | 210° C. | 2 hours |

When the acid value of the semi-product is lower than 90 mg KOH/g, the temperature-raising process is completed. Subsequently, 90 g (0.67 mole) of diethylene glycol monomethyl ether is added into the reactant mixture and reacted at 210° C. so as to form a coarse plasticizer. In Example 1, the dicarboxylic acid, the diol, and the endcapping alcohol have a molar ratio of 1:0.87:0.34.

When the acid value of the coarse plasticizer is lower than 30 mg KOH/g, the reactor starts being vacuumed. The coarse plasticizer undergoes the plurality of vacuum stages of the pressure-decreasing process according to Table 2 (step S4), so as to obtain the plasticizer.

TABLE 2

| Pressure-decreasing process | Predetermined pressure value | Duration |
| --- | --- | --- |
| First vacuum stage | 500 Torr | 1 hour |
| Second vacuum stage | 350 Torr | 1 hour |
| Third vacuum stage | 250 Torr | 1 hour |
| Fourth vacuum stage | 100 Torr | 1 hour |
| Fifth vacuum stage | 10 Torr | 1 hour |

When the acid value of the plasticizer is lower than 1 mg KOH/g, the pressure-decreasing process in step S4 is completed. Subsequently, the reactor is vigorously vacuumed so as to reach a pressure lower than 10 Torr. When the viscosity of the plasticizer achieves 3000 cps, the reaction is completed and the vacuuming is stopped. After being cooled to 40° C., the plasticizer of Example 1 is obtained (step S5).

Example 2

215 g (1.47 mole) of adipic acid, 55 g (0.47 mole) of succinic acid, 100 g (1.11 mole) of 2-methyl-1, 3-propanediol, 60 g (0.57 mole) of diethylene glycol, and 0.5 g of titanium catalyst are fed in a reactor, and then mixed under a condition of 140° C. and 760 Torr to form a reactant mixture.

Example 2 is similar to Example 1. When a temperature of the reactor rises to reach 150° C. caused by an exothermic reaction, the reactant mixture undergoes the plurality of fixed-temperature stages of the temperature-raising process according to Table 1 so as to form a semi-product (step S2). During the temperature-raising process, water and alcohol are removed.

When the acid value of the semi-product is lower than 90 mg KOH/g, the temperature-raising process is completed. Subsequently, 55 g (0.74 mole) of butanol is added into the reactant mixture and reacted at 210° C., so as to form a coarse plasticizer. In Example 2, the dicarboxylic acid, the diol, and the endcapping alcohol have a molar ratio of 1:0.87:0.38.

When the acid value of the coarse plasticizer is lower than 30 mg KOH/g, the reactor starts being vacuumed. The coarse plasticizer undergoes the plurality of vacuum stages of the pressure-decreasing process in step S4 according to Table 2, so as to obtain the plasticizer.

When the acid value of the plasticizer is lower than 1 mg KOH/g, the pressure-decreasing process in step S4 is completed. Subsequently, the reactor is vigorously vacuumed so as to reach a pressure lower than 10 Torr. When the viscosity of the plasticizer achieves 3000 cps, the reaction is completed and the vacuuming is stopped. After being cooled to 40° C., the plasticizer of Example 2 is obtained (step S5).

Example 3

430 g (2.94 mole) of adipic acid, 110 g (0.93 mole) of succinic acid, 205 g (2.27 mole) of 2-methyl-1, 3-propanediol, 120 g (1.13 mole) of diethylene glycol, and 1 g of titanium catalyst are fed in a reactor, and then mixed under a condition of 140° C. and 760 Torr to form a reactant mixture.

Example 3 is similar to Example 1. When a temperature of the reactor rises to reach 150° C. caused by an exothermic reaction, the reactant mixture undergoes the plurality of fixed temperature stages of the temperature-raising process according to Table 1 so as to form a semi-product (step S2). During the temperature-raising process, water and alcohol are removed.

When the acid value of the semi-product is lower than 90 mg KOH/g, the temperature-raising process is completed. Subsequently, 180 g (1.50 mole) of diethylene glycol monomethyl ether is added into the reactant mixture and reacted at 210° C., so as to form a coarse plasticizer. In Example 3, the dicarboxylic acid, the diol, and the endcapping alcohol have a molar ratio of 1:0.88:0.42.

When the acid value of the coarse plasticizer is lower than 30 mg KOH/g, the reactor starts being vacuumed. The coarse plasticizer undergoes the plurality of vacuum stages of the pressure-decreasing process in step S4 according to Table 2, so as to obtain the plasticizer.

When the acid value of the plasticizer is lower than 1 mg KOH/g, the pressure-decreasing process in step S4 is completed. Subsequently, the reactor is vigorously vacuumed so as to reach a pressure lower than 10 Torr. When the viscosity of the plasticizer achieves 3000 cps, the reaction is completed and the vacuuming is stopped. After being cooled to 40° C., the plasticizer of Example 3 is obtained (step S5).

Example 4

225 g (1.91 mole) of adipic acid, 100 g (1.11 mole) of 2-methyl-1, 3-propanediol, 60 g (0.57 mole) of diethylene glycol, and 0.5 g of titanium catalyst are fed in a reactor, and then mixed under a condition of 140° C. and 760 Torr to form a reactant mixture.

Example 4 is similar to Example 1. When a temperature of the reactor rises to reach 150° C. caused by an exothermic reaction, the reactant mixture undergoes the plurality of fixed temperature stages according to Table 1 so as to form a semi-product (step S2). During the temperature-raising process, water and alcohol are removed.

When the acid value of the semi-product is lower than 90 mg KOH/g, the temperature-raising process is completed. Subsequently, 70 g (0.78 mole) of diethylene glycol monomethyl ether is added into the reactant mixture and reacted at 210° C., so as to form a coarse plasticizer. In Example 4, the dicarboxylic acid, the diol, and the endcapping alcohol have a molar ratio of 1:0.88:0.41.

When the acid value of the coarse plasticizer is lower than 30 mg KOH/g, the reactor starts being vacuumed. The coarse plasticizer undergoes the plurality of vacuum stages of the pressure-decreasing process in step S4 according to Table 2, so as to obtain the plasticizer.

When the acid value of the plasticizer is lower than 1 mg KOH/g, the pressure-decreasing process in step S4 is completed. Subsequently, the reactor is vigorously vacuumed so as to reach a pressure lower than 10 Torr. When the viscosity of the plasticizer achieves 3000 cps, the reaction is completed and the vacuuming is stopped. After being cooled to 40° C., the plasticizer of Example 4 is obtained (step S5).

Example 5

280 g (1.92 mole) of adipic acid, 100 g (1.11 mole) of 2-methyl-1, 3-propanediol, 60 g (0.57 mole) of diethylene glycol, and 0.5 g of titanium catalyst are fed in a reactor, and then mixed under a condition of 140° C. and 760 Torr to form a reactant mixture.

Example 5 is similar to Example 1. When a temperature of the reactor rises to reach 150° C. caused by an exothermic reaction, the reactant mixture undergoes the plurality of fixed temperature stages of the temperature-raising process according to Table 1 so as to form a semi-product (step S2). During the temperature-raising process, water and alcohol are removed.

When the acid value of the semi-product is lower than 90 mg KOH/g, the temperature-raising process is completed. Subsequently, 70 g (0.78 mole) of diethylene glycol monomethyl ether is added into the reactant mixture and reacted at 210° C., so as to form a coarse plasticizer. In Example 5, the dicarboxylic acid, the diol, and the endcapping alcohol have a molar ratio of 1:0.88:0.41.

When the acid value of the coarse plasticizer is lower than 30 mg KOH/g, the reactor starts being vacuumed. The coarse plasticizer undergoes the plurality of vacuum stages of the pressure-decreasing process in step S4 according to Table 2, so as to obtain the plasticizer.

When the acid value of the plasticizer is lower than 1 mg KOH/g, the pressure-decreasing process in step S4 is completed. Subsequently, the reactor is vigorously vacuumed so as to reach a pressure lower than 10 Torr. When the viscosity of the plasticizer achieves 3000 cps, the reaction is completed and the vacuuming is stopped. After being cooled to 40° C., the plasticizer of Example 5 is obtained (step S5).

The surface tensions of plasticizers presently available on the market used in Comparative Examples 1 to 3 are measured and listed in Table 3. Specifically, the plasticizer in Comparative Example 1 is a product under the name of PD-15 available from Nan Ya Plastics Corporation; the plasticizer in Comparative Example 2 is a product under the name of GL-8000 available from Golden Chemical Corporation; the plasticizer in Comparative Example 3 is a product under the name of POLYMIX®208 available from Polynt Composites Ltd.

The properties of the plasticizer in Examples 1 to 5 and Comparative Examples 1 to 3 are listed in Table 3. The viscosity of the plasticizer is measured at 25° C. by a viscometer. The surface tension of the plasticizer is measured by a dyne test pen on a PVC adhesive tape having a ball indentation hardness of 43 PHR.

TABLE 3

| | Example | | | | | Comparative Example | | |
|---|---|---|---|---|---|---|---|---|
| | 1 | 2 | 3 | 4 | 5 | 1 | 2 | 3 |
| Dicarboxylic acid | Succinic acid Adipic acid | Succinic acid Adipic acid | Succinic acid Adipic acid | Succinic acid — | Adipic acid — | Adipic acid — | — | — |
| Diol | 2-Methyl-1,3-propanediol Diethylene glycol | 2-Methyl-1,3-propanediol Diethylene glycol | 2-Methyl-1,3-propanediol Diethylene glycol | 2-Methyl-1,3-propanediol Diethylene glycol | 2-Methyl-1,3-propanediol Diethylene glycol | 2-Methyl-1,3-propanediol Neopentyl glycol | — | — |
| Endcapping alcohol | Diethylene glycol monomethyl ether | Butanol | Diethylene glycol monomethyl ether | Diethylene glycol monomethyl ether | Diethylene glycol monomethyl ether | Isooctyl alcohol | — | — |
| Viscosity (25° C.)(cps) | 1901 | 2032 | 2328 | 2054 | 1987 | 2208 | — | — |
| Surface tension (dyne) | 40 | 39 | 40 | 39 | 39 | 35 | 37 | 36 to 37 |
| Average weight molecular weight | 2952 | 2882 | 3019 | 2906 | 2891 | 2956 | — | — |
| Color Alpha value | 80 | 60 | 80 | 75 | 60 | 50 | — | — |
| Acid value | 0.27 | 0.30 | 0.25 | 0.16 | 0.22 | 0.11 | 0.9 | — |
| OH value | 1.9 | 1.5 | 1.8 | 1.2 | 1.4 | 6.2 | — | — |

According to Table 3, the surface tension of the plasticizer can be enhanced (to be from 38 dynes to 40 dynes) by using succinic acid or adipic acid acting as the dicarboxylic acid and using 2-methyl-1, 3-propanediol and diethylene glycol acting as the diol to polymerize the plasticizer. Accordingly, the plasticizer of the present disclosure can be used as an environmentally friendly plasticizer such as to replace the conventional phthalates plasticizer. In addition, the plasticizer of the present disclosure can be applied in water-based processes.

Moreover, the plasticizer of the present disclosure has a color having an Alpha value of lower than 100. Therefore, quality and an appearance of a plastic material will not be negatively influenced after adding the plasticizer of the present disclosure. Preferably, the plasticizer of the present disclosure has a color having an Alpha value that ranges from 40 to 95. For example, the plasticizer has the color having an Alpha value that can be 45, 50, 55, 60, 65, 70, 75, 80, 85, or 90.

The viscosity of the plasticizer of the present disclosure measured at 25° C. ranges from 1500 cps to 3000 cps in order to have good processability. Preferably, the viscosity of the plasticizer of the present disclosure measured at 25° C. ranges from 1700 cps to 2500 cps. For example, the viscosity of the plasticizer measured at 25° C. can be 1800 cps, 1900 cps, 2000 cps, 2100 cps, 2200 cps, 2300 cps, or 2400 cps.

The average weight molecular weight of the plasticizer ranges from 2500 g/mol to 3500 g/mol. Preferably, the average weight molecular weight of the plasticizer ranges from 2600 g/mol to 3300 g/mol. For example, the average weight molecular weight of the plasticizer can be 2700 g/mol, 2800 g/mol, 2900 g/mol, 3000 g/mol, 3100 g/mol, or 3200 g/mol.

The acid value of the plasticizer ranges from 0.1 mg KOH/g to 1 mg KOH/g. Preferably, the acid value of the plasticizer ranges from 0.2 mg KOH/g to 0.5 mg KOH/g. For example, the acid value of the plasticizer can be 0.25 mg KOH/g, 0.30 mg KOH/g, 0.35 mg KOH/g, 0.40 mg KOH/g, or 0.45 mg KOH/g.

The OH value of the plasticizer ranges from 0.5 mg KOH/g to 3 mg KOH/g. Preferably, the OH value of the plasticizer ranges from 0.5 mg KOH/g to 2 mg KOH/g. For example, the OH value of the plasticizer can be 0.75 mg KOH/g, 1.0 mg KOH/g, 1.25 mg KOH/g, 1.5 mg KOH/g, or 1.75 mg KOH/g.

Beneficial Effects of the Embodiments

In conclusion, in the plasticizer and the method for manufacturing the same provided by the present disclosure, by virtue of "the dicarboxylic acid including succinic acid or adipic acid," "the glycol including diethylene glycol and 2-methyl-1, 3-propanediol," and "the endcapping alcohol being an ether alcohol or a fatty alcohol having a carbon number of less than or equal to 4," the surface tension of the plasticizer can be enhanced.

Further, by virtue of "the reactant mixture being reacted at a plurality of fixed temperature stages of a temperature-raising process," and "the coarse plasticizer being purified under a plurality of vacuum stages of a pressure-decreasing process," the quality and the appearance of the plasticizer can be enhanced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a plasticizer, comprising:
mixing dicarboxylic acids, diols, and a catalyst to form a reactant mixture, wherein the dicarboxylic acids include succinic acid or adipic acid, and the diols include diethylene glycol and 2-methyl-1,3-propanediol;
reacting the reactant mixture at a temperature ranging from 130° C. to 220° C. so as to form a semi-product;
adding an endcapping alcohol into the semi-product at a temperature ranging from 205° C. to 220° C. so as to form a coarse plasticizer, wherein the endcapping alcohol is an ether alcohol or a fatty alcohol having a carbon number of less than or equal to 4, wherein the dicarboxylic acids, the diols, and the endcapping alcohol have a molar ratio ranging from 1:0.6 to 0.9:0.3 to 0.6; and
purifying the coarse plasticizer under a pressure ranging from 760 Torr to 5 Torr so as to obtain the plasticizer.

2. The method according to claim 1, wherein the ether alcohol is selected from the group consisting of: diethylene glycol monomethyl ether, diethylene glycol monoethyl ether, diethylene glycol monobutyl ether, dipropylene glycol monomethyl ether, dipropylene glycol monoethyl ether, dipropylene glycol monobutyl ether, tripropylene glycol monomethyl ether, ethylene glycol monomethyl ether, ethylene glycol monoethyl ether, ethylene glycol monobutyl ether, propylene glycol monomethyl ether, propylene glycol monoethyl ether, and propylene glycol monobutyl ether, and the fatty alcohol is selected from the group consisting of: methanol, ethanol, isopropanol, and n-butanol.

3. The method according to claim 1, wherein the dicarboxylic acids include succinic acid and adipic acid, a molar amount of succinic acid is less than or equal to a molar amount of adipic acid, and a molar ratio of succinic acid to the total amount of the dicarboxylic acids is higher than or equal to 0.2.

4. The method according to claim 3, wherein a molar ratio of succinic acid to adipic acid ranges from 1:1 to 1:4.

5. The method according to claim 1, wherein a molar amount of diethylene glycol is less than or equal to a molar amount of 2-methyl-1, 3-propanediol, and a molar ratio of diethylene glycol to the total amount of the diols is higher than or equal to 0.25.

6. The method according to claim 5, wherein a molar ratio of diethylene glycol to 2-methyl-1, 3-propanediol ranges from 1:1 to 1:3.

7. The method according to claim 1, wherein the reactant mixture is reacted under a plurality of fixed temperature stages of a temperature-raising process, a temperature range of the temperature-raising process ranges from 130° C. to 220° C., the coarse plasticizer is purified under a plurality of vacuum stages of a pressure-decreasing process so as to obtain the plasticizer, and a pressure range of the pressure-decreasing process ranges from 760 Torr to 5 Torr.

8. The method according to claim 7, wherein the plurality of fixed temperature stages includes a first fixed temperature stage, a second fixed temperature stage, a third fixed temperature stage, a fourth fixed temperature stage, and a fifth fixed temperature stage, a temperature range of the first fixed temperature stage ranges from 130° C. to 150° C., a temperature range of the second fixed temperature stage ranges from 150° C. to 170° C., a temperature range of the third fixed temperature stage ranges from 170° C. to 190° C., a temperature range of the fourth fixed temperature stage ranges from 190° C. to 205° C., and a temperature range of the fifth fixed temperature stage ranges from 205° C. to 220° C.

9. The method according to claim 7, wherein, when an acid value of the semi-product ranges from 70 mg KOH/g to 90 mg KOH/g, the temperature-raising process is completed.

10. The method according to claim 7, wherein, when an acid value of the coarse plasticizer ranges from 10 mg KOH/g to 30 mg KOH/g, the pressure-decreasing process is started.

11. The method according to claim 7, wherein the pressure-decreasing process includes a first vacuum stage, a second vacuum stage, a third vacuum stage, a fourth vacuum stage, and a fifth vacuum stage, a pressure range of the first vacuum stage ranges from 750 Torr to 400 Torr, a pressure range of the second vacuum stage ranges from 400 Torr to 300 Torr, a pressure range of the third vacuum stage ranges from 300 Torr to 150 Torr, a pressure range of the fourth vacuum stage ranges from 150 Torr to 20 Torr, and a pressure range of the fifth vacuum stage ranges from 20 Torr to 10 Torr.

12. The method according to claim 7, further comprising: feeding the dicarboxylic acids, the diols, and the catalyst into a reactor, and adding the endcapping alcohol during the temperature-raising process so as to form the reactant mixture.

13. A plasticizer, polymerized from dicarboxylic acids, diols, and an endcapping alcohol,
wherein the dicarboxylic acids, the diols, and the endcapping alcohol have a molar ratio ranging from 1:0.6 to 0.9:0.3 to 0.6,
wherein the dicarboxylic acids include succinic acid and adipic acid, the diols include diethylene glycol and 2-methyl-1, 3-propanediol, and the endcapping alcohol is an ether alcohol or a fatty alcohol having a carbon number of less than or equal to 4, and
wherein a molar ratio of the succinic acid to the adipic acid ranges from 1:1 to 1:4.

14. The plasticizer according to claim 13, wherein a viscosity of the plasticizer ranges from 1500 cps to 3000 cps.

15. The plasticizer according to claim 13, wherein a weight-average molecular weight of the plasticizer ranges from 2500 g/mol to 3500 g/mol.

16. The plasticizer according to claim 13, wherein the ether alcohol is selected from the group consisting of: diethylene glycol monomethyl ether, diethylene glycol monoethyl ether, diethylene glycol monobutyl ether, dipropylene glycol monomethyl ether, dipropylene glycol monoethyl ether, dipropylene glycol monobutyl ether, tripropylene glycol monomethyl ether, ethylene glycol monomethyl ether, ethylene glycol monoethyl ether, ethylene glycol monobutyl ether, propylene glycol monomethyl ether, propylene glycol monoethyl ether, and propylene glycol monobutyl ether, and the fatty alcohol is selected from the group consisting of: methanol, ethanol, isopropanol, and n-butanol.

17. The plasticizer according to claim 13, wherein a molar ratio of diethylene glycol to 2-methyl-1, 3-propanediol ranges from 1:1 to 1:3.

* * * * *